(12) United States Patent
Chung

(10) Patent No.: US 10,192,158 B2
(45) Date of Patent: Jan. 29, 2019

(54) ELECTRONIC PRICE INDICATOR, POWER SUPPLY APPARATUS AND ELECTRIC PRICE INDICATING SYSTEM

(71) Applicant: LG Innotek Co., Ltd., Seoul (KR)

(72) Inventor: Won Suk Chung, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 0 days.

(21) Appl. No.: 15/535,353

(22) PCT Filed: Nov. 13, 2015

(86) PCT No.: PCT/KR2015/012214
§ 371 (c)(1),
(2) Date: Jun. 12, 2017

(87) PCT Pub. No.: WO2016/093501
PCT Pub. Date: Jun. 16, 2016

(65) Prior Publication Data
US 2017/0323192 A1    Nov. 9, 2017

(30) Foreign Application Priority Data

Dec. 10, 2014 (KR) .................. 10-2014-0177535

(51) Int. Cl.
*G06K 15/00* (2006.01)
*G06K 19/077* (2006.01)
(Continued)

(52) U.S. Cl.
CPC ....... *G06K 19/07707* (2013.01); *G06F 3/147* (2013.01); *G06K 7/10336* (2013.01);
(Continued)

(58) Field of Classification Search
CPC ............ A61N 1/37223; A61N 1/37252; A61N 1/3785; A61N 1/3787; B32B 2519/02;
(Continued)

(56) References Cited

U.S. PATENT DOCUMENTS 7,152,040 B1 * 12/2006 Hawthorne .......... G06Q 10/087
705/16
2005/0218208 A1    10/2005 Sugie et al.
(Continued)

FOREIGN PATENT DOCUMENTS

EP          2 642 629 A1    9/2013
EP          2720143 A1      4/2014
(Continued)

OTHER PUBLICATIONS

International Search Report in International Application No. PCT/KR2015/012214, filed Nov. 13, 2015.
European Search Report dated May 25, 2018 in European Application No. 15868570.1.

*Primary Examiner* — Thien M Le
(74) *Attorney, Agent, or Firm* — Saliwanchik, Lloyd & Eisenschenk

(57) ABSTRACT

An electronic price indicating system according to the embodiment includes: at least one electronic price indicator for displaying product information; and a power supply apparatus connected to the at least one electronic price indicator to supply a driving signal which is driving power of the at least one electronic price indicator. The power supply apparatus includes: a power supply unit connected to the at least one electronic price indicator and supplying driving power to the electronic price indicator; an antenna for receiving data transmitted from a server; and a communication unit for confirming a first electronic price indicator to which data received via the antenna is to be applied and supplying power to the confirmed first electronic price indicator, wherein the communication unit controls an operation of the power supply unit, modulates the power supply signal according to the received data, and supplies (Continued)

the modulated power supply signal to the first electronic price indicator.

14 Claims, 7 Drawing Sheets

(51) Int. Cl.
*G06K 17/00* (2006.01)
*G06K 7/10* (2006.01)
*G06F 3/147* (2006.01)
*G06F 3/14* (2006.01)
*H04B 3/54* (2006.01)

(52) U.S. Cl.
CPC .......... *G06K 17/00* (2013.01); *G06K 17/0029* (2013.01); *G06K 19/077* (2013.01); *G06F 3/1423* (2013.01); *G06F 3/1454* (2013.01); *G06K 2017/0067* (2013.01); *G09G 2370/022* (2013.01); *G09G 2370/042* (2013.01); *G09G 2370/10* (2013.01); *G09G 2380/04* (2013.01); *H04B 3/54* (2013.01)

(58) Field of Classification Search
CPC ............... G06K 17/00; G06K 19/0723; G06K 19/07758; G06K 2017/0051; G06K 7/10178; G06K 7/10237; G06Q 10/087; G06Q 20/20

USPC ........................................................ 235/383
See application file for complete search history.

(56) References Cited

U.S. PATENT DOCUMENTS

| | | | |
|---|---|---|---|
| 2008/0224831 A1* | 9/2008 | Arai | G06K 7/10178 340/10.51 |
| 2009/0058361 A1* | 3/2009 | John | A61N 1/3785 320/128 |
| 2009/0096609 A1* | 4/2009 | Huang | B32B 37/02 340/572.1 |
| 2011/0102155 A1 | 5/2011 | Choi et al. | |
| 2011/0156906 A1* | 6/2011 | Chou | G06K 7/10237 340/572.1 |
| 2011/0241843 A1 | 10/2011 | Marsanne et al. | |
| 2013/0285616 A1 | 10/2013 | Washiro | |
| 2015/0180837 A1* | 6/2015 | Ryu | H04L 63/062 713/171 |

FOREIGN PATENT DOCUMENTS

| | | |
|---|---|---|
| KR | 10-0795755 B1 | 1/2008 |
| KR | 10-0949364 B1 | 3/2010 |
| KR | 10-2014-0067363 A | 6/2014 |
| WO | WO-2013/121113 A1 | 8/2013 |

\* cited by examiner

ASK 10%
NRZ-L, 106k bit/s

| | TYPE1 | TYPE2 |
|---|---|---|
| P1 SIGNAL | ◆ Data Selection<br>1) High : 5V<br>2) Low : 3V | High |
| P2 SIGNAL | Switching<br>13.56MHz | ◆ Data Selection<br>1) High : Switching<br>(13.56MHz)<br>2) Low : Low |
| OUTPUT WAVEFORM | | |

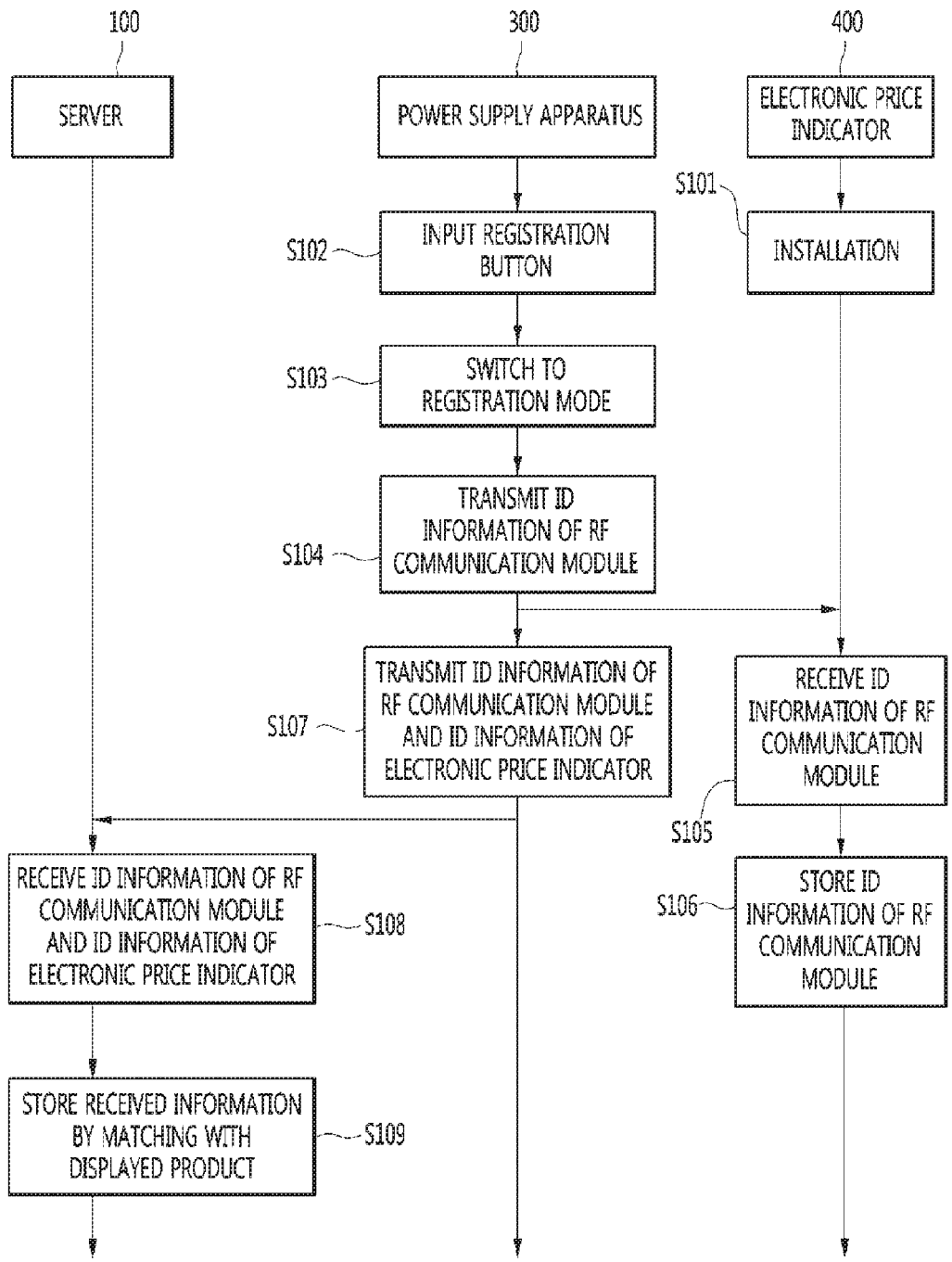

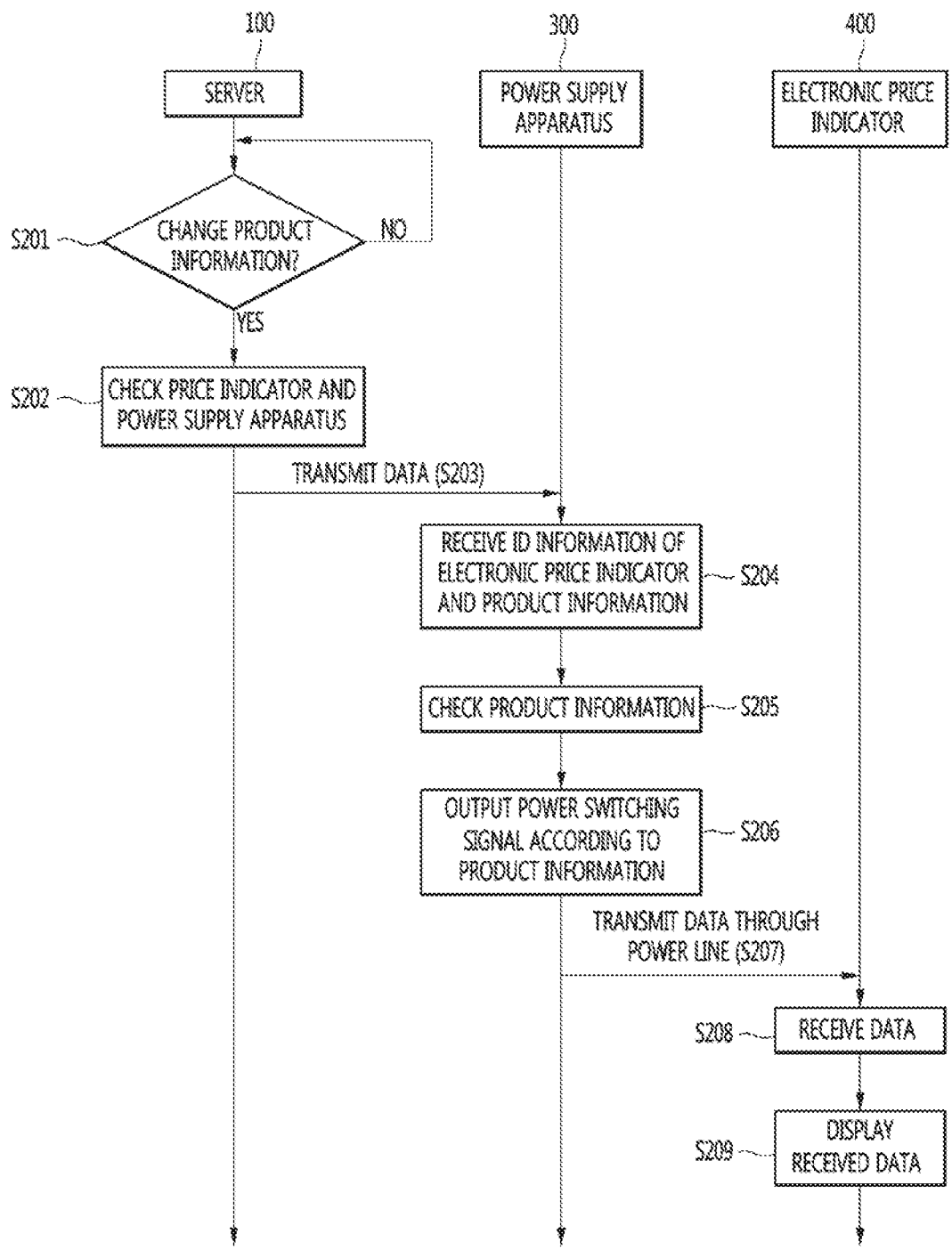

_(1)_

ELECTRONIC PRICE INDICATOR, POWER SUPPLY APPARATUS AND ELECTRIC PRICE INDICATING SYSTEM

CROSS-REFERENCE TO RELATED APPLICATIONS

This application is the U.S. national stage application of International Patent Application No. PCT/KR2015/012214, filed Nov. 13, 2015, which claims priority to Korean Application No. 10-2014-0177535, filed Dec. 10, 2014, the disclosures of each of which are incorporated herein by reference in their entirety.

TECHNICAL FIELD

The embodiment relates to an electronic price indicator, and in particular, to an electronic price indicator that does not have a wireless communication function.

BACKGROUND ART

Generally, in a distribution store, paper labels which indicate product information, such as a selling price, discount information, a unit price, and a place of origin, of a product displayed on a shelf are used. In a price indicating method using such paper labels, because a paper label in use has to be discarded and a new paper label should be filled in when product information is changed or a product display position is changed, expenses are continuously incurred for maintenance and repair. Further, also in terms of the environmental aspect, because paper, which is a raw material, is wasted, there is a negative influence on environmental protection.

Consequently, as a means for substituting a conventional paper label, research and development on an electronic price indicator (or an electronic shelf label (ESL)) are being vigorously carried out.

An electronic price indicator receives price-related information of a corresponding product from a central control center (server) through a wireless device (e.g., a gateway) and displays the received price-related information to provide information on the corresponding product in real time.

Here, the electronic price indicator displays frequent changes in information, discount information, or the like of the corresponding product and provides user convenience.

Nowadays, displaying numerous pieces of information such as a store symbol, a promotion image, a barcode, a product name, a product image and place-of-origin information as well as price information is required.

The electronic price indicating system includes a server, a gateway, and a plurality of electronic price indicators.

Here, the gateway and the server are connected by a wired system, the gateway and the plurality of electronic price indicators are wirelessly connected, and the gateway and the electronic price indicator performs one-way communication or two-way communication depending on types of the electronic price indicators.

Meanwhile, the electronic price indicator as above is differentiated into a first type and a second type according to a power supply method.

FIG. 1 is a view illustrating a first type electronic price indicator according to the related art, and FIG. 2 is a view illustrating a second type electronic price indicator according to the related art.

Referring to FIG. 1, an electronic price indicator of a first type includes a battery 1, a power supply unit 2, a first antenna 3, a first communication unit 4, a second antenna 5, a second communication unit 6, and a display unit.

The first type described above is an electronic price indicator, wherein the power supply apparatus includes the battery 1 and is driven by a power output through the embedded battery 1 as driving power.

The first antenna 3 and the first communication unit 4 receive various data by communicating with a server. The first antenna 3 and the first communication unit 4 may communicate with the server using an RF communication method.

The second antenna 5 and the second communication unit 6 are elements for communicating with a terminal of an administrator and receiving various data and control signals. The second antenna 5 and the second communication unit 6 are a near field communication (NFC) module, and are a module for short-range communication.

The power supply unit 2 generates driving power required by various elements using the power supplied through the battery 1.

The display unit 7 is an e-paper display (EPD) device and displays data, such as product information or the like, received through the first communication unit 4 or the second communication unit 6.

Referring to FIG. 2, an electronic price indicator of a second type includes a first power supply terminal 11, a second power supply terminal 12, a power supply unit 13, a first antenna 14, a first communication unit 15, a second antenna 16, a second communication unit 17, and a display unit 18.

The second type described above is an electronic price indicator that includes the first power supply terminal 11 and the second power supply terminal 12 so that power supplied from an external power supply apparatus is received through the first power supply terminal 11 and the second power supply terminal 12, and is driven by the received power as driving power.

The first antenna 14 and the first communication unit 15 receive various data by communicating with a server. The first antenna 14 and the first communication unit 15 may communicate with the server using an RF communication method.

The second antenna 16 and the second communication unit 17 are elements for communicating with the terminal of the administrator and receiving various data and control signals. The second antenna 16 and the second communication unit 17 are a near field communication (NFC) module, and are a module for short-range communication.

The power supply unit 13 generates driving power required by various elements using the power received through the first power supply terminal 11 and the second power supply terminal 12.

The display unit 18 is an e-paper display (EPD) device and displays data, such as product information or the like, received through the first communication unit 15 or the second communication unit 17.

Meanwhile, the first and second types of electronic price indicators described above must include a first communication unit and a second communication unit, respectively. Here, the second communication unit may be selectively provided depending on the option, but the first communication unit for communication with the server is necessarily provided in each electronic price indicator.

Accordingly, when ten electronic price indicators are installed, ten communication modules are required, which acts as a factor to raise a unit price of an electronic price indicator.

DISCLOSURE

Technical Problem

According to the embodiment of the present disclosure, an electronic price indicator that can remove a communication module for communication with a server from the electronic price indicator, a power supply apparatus, and an electronic price indication system are provided.

Further, according to the embodiment, a power supply apparatus and an electronic price indication system in which data can be transmitted to a plurality of connected electronic price indicators using an installed common communication module is provided, wherein the common communication module is a module installed in a power supply apparatus connected to the plurality of electronic price indicators and supplying power to the plurality of electronic price indicators.

Technical problems to be solved by the embodiments proposed herein are not limited to those mentioned above, and other unmentioned technical aspects should be clearly understood by one of ordinary skill in the art to which the embodiments proposed herein pertain from the description below.

Technical Solution

A power supply apparatus according to the embodiment includes a power supply unit connected to at least one electronic price indicator for supplying driving power to the electronic price indicator; an antenna for receiving data transmitted from a server; and a communication unit for confirming a first electronic price indicator to which data received via the antenna is to be applied and supplying power to the first electronic price indicator, and the communication unit controls an operation of the power supply unit so that a power supply signal modulated according to the received data is supplied to the first electronic price indicator.

Further, the power supply unit is connected to the at least one electronic price indicator through a first power supply line for supplying a power supply signal and a second power supply line for grounding, and transmits a power supply signal modulated by the data through the first power supply line to the first electronic price indicator.

Furthermore, the modulated power supply signal includes a first section in which a first level voltage is input and a second section in which a voltage in a second level different from the first level is input.

In addition, the modulated power supply signal includes a first section in which a first level voltage is input and a second section in which no voltage is input.

Further, the power supply unit includes: a first regulator connected to a power supply voltage and generating an output voltage according to a first control signal output through the communication unit; a second regulator driven by an output voltage generated through the first regulator and generating the first level voltage according to a second control signal output through the communication unit; a third regulator driven by an output voltage generated through the first regulator, and generating the second level voltage according to a second control signal output through the communication unit; a first switching device having a collector connected to the second regulator and the power supply voltage, a base connected to the communication unit, and an emitter grounded; and a second switching device having an emitter connected to the third regulator, a base connected to the communication unit, and a collector connected to the power supply voltage.

Furthermore, the power supply unit includes: a first regulator connected to a power supply voltage and generating an output voltage according to a first control signal output through the communication unit; a second regulator driven by an output voltage generated through the first regulator and generating the first level voltage according to a second control signal output through the communication unit; and a second switching device having an emitter connected to the second regulator, a base connected to the communication unit, and a collector connected to the power supply voltage.

Further, the communication unit outputs a first control signal of a high level and a second control signal of either a high level or a low level according to the received data. The third regulator operates when the second control signal has a high level. And, the second regulator operates when the second control signal has a low level.

Further, the communication unit outputs a second control signal of a high level and a first control signal of either a high level or a low level according to the received data. Moreover, the second regulator operates when the first control signal of the high level is outputted to output the first level voltage.

Further, a registration button for registering an unregistered second electronic price indicator is further included. The communication unit supplies a power supply signal modulated by identification information thereof to the second electronic price indicator as the registration button is input.

Further, the power supply signal is modulated by a near field communication (NFC) communication protocol.

Meanwhile, an electronic price indicator according to the embodiment includes: a smoothing unit including a power port connected to a power supply apparatus and receiving a power supply signal supplied from the power supply apparatus; a communication unit driven by the power supply signal received through the smoothing unit and analyzing the power supply signal to confirm product information; and a display unit for displaying the product information confirmed through the communication unit, wherein the power supply signal is modulated based on data corresponding to the product information.

Further, the electronic price indicator does not have a communication module for communication with a server.

Further, the modulated power supply signal includes a first section in which a voltage of a first level is input and a second section in which a voltage of a second level different from the first level is input, and the communication unit recognizes the first section and the second section as 0 and 1, respectively.

Further, the modulated power supply signal includes a first section in which a first level voltage is input and a second section in which no voltage is input, and the communication unit recognizes 0 and 1 based on the change point of the first section and the second section and a previous data value, respectively.

Further, the power supply signal is modulated by a near field communication (NFC) communication protocol, and the communication unit is an NFC communication module.

Meanwhile, an electronic price indicating system according to the embodiment includes: at least one electronic price indicator for displaying product information; and a power supply apparatus connected to the at least one electronic price indicator to supply a driving signal which is driving power of the at least one electronic price indicator. The power supply apparatus includes: a power supply unit connected to the at least one electronic price indicator and supplying driving power to the electronic price indicator; an antenna for receiving data transmitted from a server; and a communication unit for confirming a first electronic price indicator to which data received via the antenna is to be applied and supplying power to the confirmed first electronic price indicator, wherein the communication unit controls an operation of the power supply unit, modulates the power supply signal according to the received data, and supplies the modulated power supply signal to the first electronic price indicator.

Further, the power supply unit includes: a first regulator connected to a power supply voltage and generating an output voltage according to a first control signal output through the communication unit; a second regulator driven by an output voltage generated through the first regulator and generating a first level voltage according to a second control signal output through the communication unit; a third regulator driven by an output voltage generated through the first regulator, and generating a second level voltage different from the first level according to a second control signal outputted through the communication unit; a first switching device having a collector connected to the second regulator and the power supply voltage, a base connected to the communication unit, and an emitter grounded; and a second switching device having an emitter connected to the third regulator, a base connected to the communication unit, and a collector connected to the power supply voltage.

Furthermore, the modulated power supply signal includes a first section in which the first level voltage is input and a second section in which a voltage in the second level is input.

In addition, the modulated power supply signal includes a first section in which the second level voltage is input and a second section in which no voltage is input.

Further, the communication unit outputs a first control signal of a high level and a second control signal of either a high level or a low level according to the received data. The third regulator operates when the second control signal has a high level. And, the second regulator operates when the second control signal has a low level.

Further, the communication unit outputs a second control signal of a high level and a first control signal of either a high level or a low level according to the received data. Moreover, the second regulator does not always operate by the second control signal of the high level, and the third regulator operates when the first control signal of the high level is output to output the second level voltage.

Advantageous Effects

According to the embodiment, a RF communication module to be provided in an electronic price indicator and a peripheral circuit connected thereto may be removed, thereby reducing unit cost of a product. That is, conventionally, if ten electronic price indicators and a power supply apparatus are connected, ten communication modules are required. However, according to the embodiment, since only one communication module is required, price competitiveness may be ensured accordingly.

In addition, according to the embodiment, since a block for ensuring communication performance inside the electronic price indicator is simplified, the degree of freedom of design may be increased.

Further, according to the embodiment, interference due to RF communication occurring between a plurality of electronic price indicators installed in the same shelf may be eliminated, thereby improving communication reliability.

In addition, according to the embodiment, an existing NFC communication protocol may be used as it is when data is transmitted through a power supply line, thereby having an advantage of simplifying a network structure and not requiring to develop a separate communication protocol.

DESCRIPTION OF DRAWINGS

FIG. 10 is a flowchart for describing a step-by-step method of registering an electronic price indicator 400 according to an embodiment of the present disclosure.

FIG. 11 is a flowchart for describing a step-by-step method of transmitting data to the electronic price indicator 400 according to an embodiment of the present disclosure.

MODES OF THE INVENTION

Figure 1:
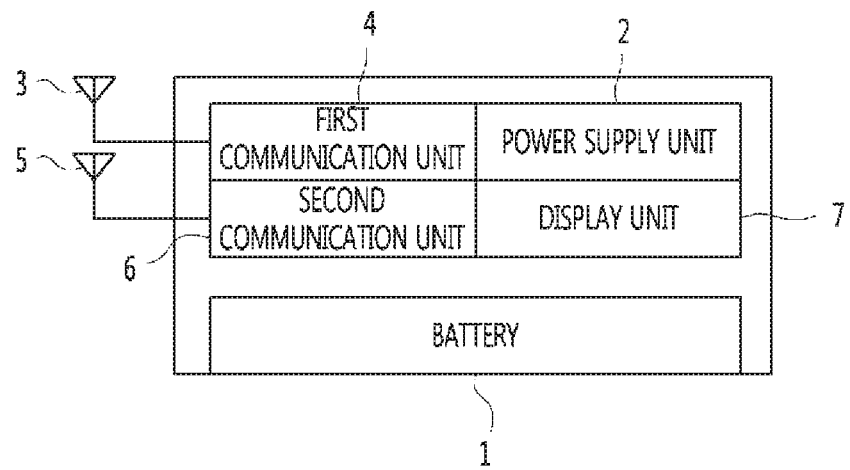
FIG. 1 is a view illustrating a first type electronic price indicator according to the related art.
Figure 2:
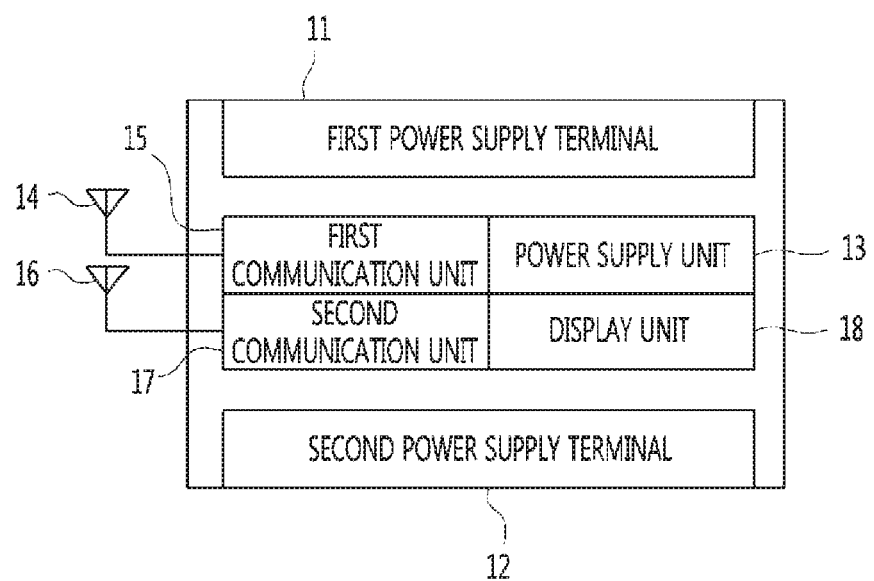
FIG. 2 is a view illustrating a second type electronic price indicator according to the related art.

Advantages, features, and methods of achieving the same of the present disclosure will become clear upon referring to embodiments described below in detail with reference to the accompanying drawings. However, the present disclosure is not limited to the embodiments disclosed below and may be implemented in various other forms. The embodiments are merely provided to make the disclosure of the present disclosure complete and completely inform one of ordinary skill in the art to which the present disclosure pertains of the scope of the present disclosure. The present disclosure is defined only by the scope of the claims below. Like reference numerals refer to like elements throughout.

In describing embodiments of the present disclosure, when detailed description of a known function or configuration is deemed to unnecessarily blur the gist of the present disclosure, the detailed description will be omitted. Terms described below are terms defined in consideration of functions in the embodiments of the present disclosure and may vary depending on the intention of a user or operator or a practice. Therefore, such terms should be defined on the basis of the entire contents disclosed herein.

Combinations of blocks and steps of flowcharts in the accompanying drawings can be performed by computer program instructions. Such computer program instructions can be embedded in a processor of a general-purpose computer, a special-purpose computer, or other programmable data processing equipment. Therefore, the instructions performed by the processor of other programmable data processing equipment generate means for performing functions described in each of the blocks or each of the steps in the flowcharts in the drawings. Therefore, the instructions performed by the processor of other programmable data processing equipment generate means for performing functions described in each of the blocks or each of the steps in the flowcharts in the drawings. Because the computer program instructions can also be saved in a computer-usable or computer-readable memory capable of supporting a computer or other programmable data processing equipment to implement a function in a specific way, the instructions stored in the computer-usable or computer-readable memory can also produce a manufacturing item which incorporates an instruction means performing a function described in each of the blocks or each of the steps of the flowcharts in the drawings. Because the computer program instructions can also be embedded in a computer or other programmable data processing equipment, the instructions performed in a computer or other programmable data processing equipment by a process executed in a computer being generated by a series of operation steps being performed in the computer or other programmable data processing equipment can also provide steps for executing functions described in each of the blocks and each of the steps of the flowcharts in the drawings.

Each of the blocks or each of the steps may represent a module, a segment, or a part of a code including one or more executable instructions for executing a specified logical function(s). Also, it should be noted that functions mentioned in the blocks or steps can also be performed in a different order in a few alternative embodiments. For example, two blocks or steps which are consecutively illustrated can substantially be performed simultaneously, or the blocks or steps can also be performed in a reverse order sometimes according to corresponding functions.

Figure 3:
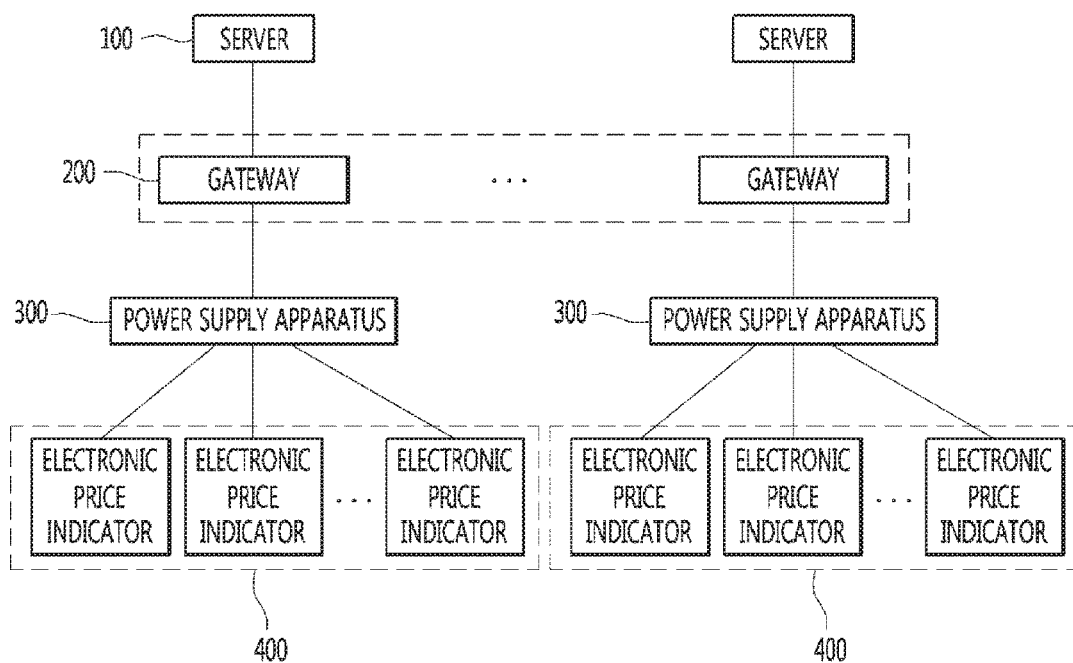
FIG. 3 is a schematic configuration diagram of an electronic price indicating system according to an embodiment of the present disclosure.

FIG. 3 is a schematic block diagram of an electronic price indicating system according to an embodiment of the present disclosure.

Referring to FIG. 3, an electronic price indicating system includes a server 100, a gateway 200, a power supply apparatus 300, and an electronic price indicator 400.

The server 100 may be implemented as a database server configured to store and manage product information on products displayed in a location such as a distribution store.

The server 100 may store various information required in managing a distribution store in addition to product information.

In addition, the server 100 may write and manage command messages for performing various functions such as synchronizing, updating, and changing product information displayed on the electronic price indicator 400.

For this, the server 100 may include a database related to the electronic price indicator 400 and product information displayed thereon.

That is, the server 100 may include a database in which identification information of the electronic price indicator 400 and product information displayed on the electronic price indicator 400 are stored by being interconnected.

In other words, the electronic price indicator 400 is provided in plurality to respectively display pieces of information on a plurality of products. Here, each of the plurality of electronic price indicators 400 contains identification information to be differentiated from other electronic price indicators 400.

Consequently, the server 100 may include a database in which identification information of each of the plurality of the electronic price indicators 400 and product information displayed on each of the electronic price indicator 400 are stored by being interconnected.

Here, each of the plurality of electronic price indicators 400 in the embodiment does not include a communication module for communication with the server 100. Accordingly, in order to communicate with a specific electronic price indicator 400, the server 100 must check the power supply apparatus 300 connected to the specific electronic price indicator 400 and must transmit data to be transmitted to the specific electronic price indicator 300 to the checked power supply apparatus 300.

For this, the server 100 stores identification information of the power supply apparatus 300 that supplies power to the electronic price indicator 400 together with identification information of the electronic price indicator 400.

Here, the identification information of the power supply apparatus 300 may be a specific identification (ID) or a media access control (MAC) address of an RF communication module provided for communication with the server 100. The identification information of the electronic price indicator 400 may be a product number or barcode of the electronic price indicator 400.

Accordingly, the server 100 checks the identification information of the power supply apparatus 300 connected to the specific electronic price indicator 400 when data or a management signal to be transmitted to the specific electronic price indicator 400 is generated, and transmits data to be transmitted to the specific electronic price indicator 400 to the power supply apparatus 300 corresponding to the checked identification information.

Here, the server 100 transmits the data to be transmitted to the specific electronic price indicator 400 and the identification information of the specific electronic price indicator 400 to the power supply apparatus 300 together. Accordingly, the server 100 may allow a receiving side to easily confirm the final destination of the transmitted data.

The gateway 200 performs communication with the server 100, and accordingly, transmits product information transmitted from the server 100 to a corresponding power supply apparatus 300.

For this, the gateway 200 is preferably provided in plurality.

Here, a network interface is configured between the server 100 and the gateway 200.

The network interface may perform a function of forming a communication channel between the server 100 and the gateway 200 so that a command message generated in the server 100 (e.g., a product information update message, a product information change message, a management information acquisition message) is transmitted to the gateway 200 in real time. That is, for example, the network interface may configure a message generated in the server 100 as a packet appropriate for a preset communication method used in communication with the gateway 200 and perform a function of transmitting the message. Also, by receiving a receipt confirmation message transmitted from the gateway 200 in the preset communication method, converting the message into a message receivable by the server 100, and transmitting the message, the network interface may allow succeeding operations to be performed.

The gateway 200 serves to analyze data received from the server 100, check whether a message or data to be transmitted to the power supply apparatus 300 communicating with itself is present, and transmit the checked message or data to the corresponding power supply apparatus 300 when the message or data to be transmitted is checked as being present.

The gateway 200 may configure a message to be transmitted to the power supply apparatus 300 as a packet according to a preset communication method and transmit the configured packet to the corresponding power supply apparatus 300.

Also, the gateway 200 may receive a receipt confirmation message transmitted from the power supply apparatus 300 and transmit the received receipt confirmation message to the server 100.

A ZigBee wireless communication method (i.e., IEEE 802.15.4) may be applied to the gateway 200 and the power supply apparatus 300 so that a single gateway is able to communicate with a plurality of power supply apparatus 300. Also, wireless communication methods such as wireless fidelity (Wi-Fi, i.e., IEEE 802.11) and Bluetooth (i.e., IEEE 802.15.1) can be applied to the gateway 200 and the power supply apparatus 300 so that data is transmitted and received at high speed.

The power supply apparatus 300 is connected to a plurality of electronic price indicators 400 through a power supply line, thereby supplying driving power for driving the plurality of connected electronic price indicators 400 through the connected power supply line.

At this point, the power supply line connecting the power supply apparatus 300 and the electronic price indicator 400 includes a first power supply line for supplying VDD power and a second power supply line for grounding.

The power supply apparatus 300 supplies driving power to the connected electronic price indicator 400 through the first power supply line.

Further, when the data to be transmitted to the specific electronic price indicator 400 among the connected electronic price indicators 400 is received, the power supply apparatus 300 transmits the received data through the first power supply line.

At this point, when the power supply apparatus 300 transmits the data, the power supply apparatus 300 may transmit the identification information of the specific electronic price indicator 400 to which the data is to be applied together with the data to be transmitted.

When transmitting the data, the power supply apparatus 300 transmits the data through the first power supply line based on a modulation method according to a near field communication (NFC) protocol.

For this, the power supply apparatus 300 includes a plurality of regulators for delivering a voltage to the specific electronic price indicator 400, wherein the voltage is distinguished between "0" and "1" by using at least two different voltage differences, and classified by "0" and "1".

The power supply apparatus 300 controls the operations of the plurality of regulators to transmit power according to a mixture of a first voltage and a second voltage to the electronic price indicator 400, so that data classification of "0" and "1" by the mixture may be performed.

Alternatively, the power supply apparatus 300 may control the operations of the plurality of regulators to transmit only the power according to the first voltage to the electronic price indicator 400. In this case, the classification of "0" and "1" is determined according to a state of a first section in which the first voltage exists and a state of a second section in which the first voltage does not exist.

That is, the power supply apparatus 300 transmits the data using either a NRZ-L method or a Modified Miller method according to the NFC protocol.

The Modified Miller method is a type of ASK 100% and 106 k bit/s, and the NRZ-L method is a type of ASK 10% and 106 k bit/s. The type is defined by type A and type B of ISO/IEC 14443 of the NFC standard.

The electronic price indicator 400 is operated by power supplied through the power supply apparatus 300.

In addition, the electronic price indicator 400 receives data for the product information transmitted from the gateway 200 from the power supply apparatus 300 and displays the received data on a display.

In addition, the electronic price indicator 400 may transmit an operation result to the power supply apparatus 300 upon receipt of data on the product information transmitted from the power supply apparatus 300.

At this point, a plurality of electronic price indicators 400 may communicate with one power supply apparatus 300.

Each of the plurality of electronic price indicators 400 receives a wake-up signal transmitted from a separate external apparatus without receiving a wake-up signal from the server 100. Here, the separate external apparatus may be a terminal owned by a manager.

The terminal may include a mobile phone, a smartphone, a laptop computer, a digital broadcasting terminal, a personal digital assistant (PDA), a portable multimedia player (PMP), and a navigation device.

Hereinafter, the electronic price indicator 400 will be described in more detail with reference to FIG. 4.

Figure 4:
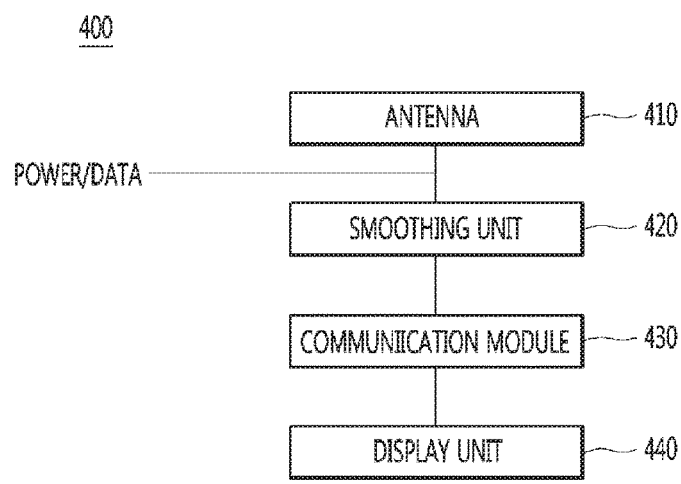
FIG. 4 is a view illustrating a detailed configuration of an electronic price indicator as shown in FIG. 3.

FIG. 4 is a view illustrating a detailed configuration of the electronic price indicator as shown in FIG. 3.

Referring to FIG. 4, the electronic price indicator 400 includes an antenna 410, a smoothing unit 420, a communication module 430, and a display unit 440.

The antenna 410 may be an antenna for NFC communication, and may receive a signal transmitted from the terminal of the manager.

The smoothing unit 420 may include a plurality of rectifying diodes in the form of a bridge and may supply power to each element of the electronic price indicator 400 based on the power supplied from the power supply apparatus 300.

At this point, a power input port is formed between the antenna 410 and the smoothing unit 420. The power input port includes a first power input port connected to the VDD power and the first power supply line to which data is transmitted and a second power input port connected to the second power supply line of the ground.

Therefore, the smoothing unit 420 smooths the power input through the first and second power input ports so as to supply the driving power required for each element.

In addition, the smoothing unit 420 supplies the data input through the first power input port to the communication module 430.

The communication module 430 may determine the operation mode of the electronic price indicator 400 using data received through the antenna 410.

Accordingly, the data received through the antenna 410 may be a management signal for determining the operation mode.

The management signal may include a first signal for wake up, a second signal for keep alive, a third signal for reset, and a fourth signal for entry into deep sleep.

In addition, the management signal described above may be transmitted from the power supply apparatus 300, not from the antenna 410, through the first power input port.

That is, the management signal may be transmitted from the server 100 as a specific electronic price indicator 400 requiring management is generated among a plurality of electronic price indicators 400. Accordingly, the management signal transmitted from the server 100 may be transmitted to the specific electronic price indicator 400 through the power supply apparatus 300.

The communication module 430 receives data transmitted from the power supply apparatus 300 through the power supply line, and analyzes the received data.

Further, the communication module 430 confirms the product information transmitted from the server 100 according to the data analysis result, and transmits the confirmed product information to the display unit 440.

The display unit 440 displays the product related information transmitted through the communication module 430. At this point, the display unit 440 may be implemented as an electronic paper (E-paper).

Meanwhile, the product related information displayed on the display unit 440 may include various information such as a store symbol, a promotion image, a barcode, a product name, a product image, place-of-origin information, a product price, and discount information.

Accordingly, the electronic price indicator 400 may receive merchandise related information and management signals transmitted from the server 100 without having a separate communication module for communication with the server 100, and thus it is possible to display the received product related information or to enter the operation mode according to the management signal.

Hereinafter, the power supply apparatus 300 according to the embodiment of the present disclosure will be described in more detail with reference to FIG. 5.

Figure 5:
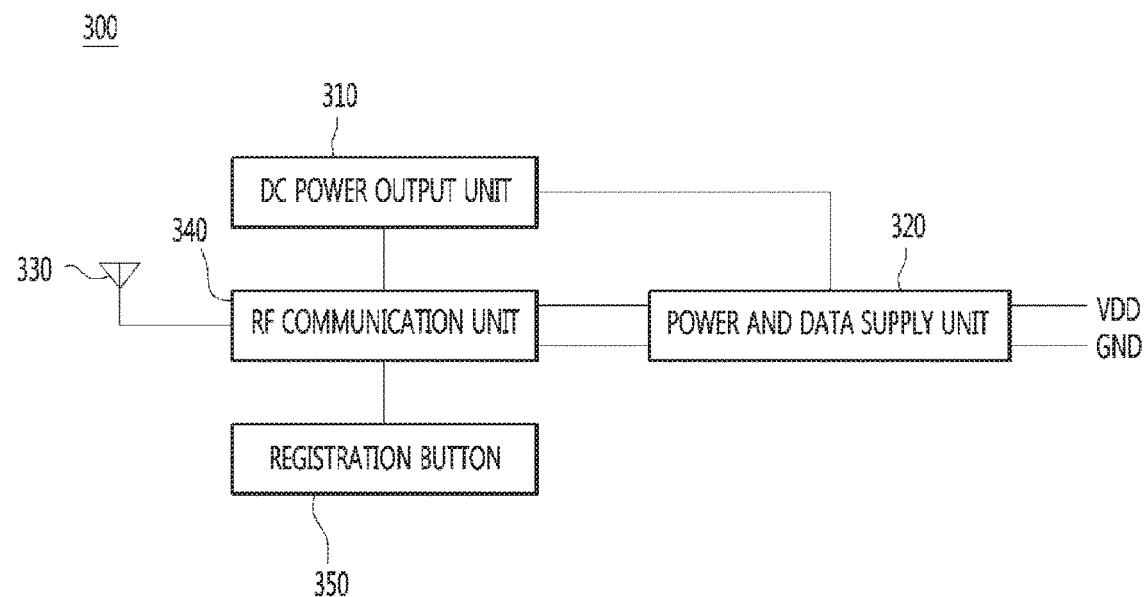
FIG. 5 is a view illustrating a detailed configuration of a power supply apparatus 300 as shown in FIG. 3.

FIG. 5 is a view illustrating a detailed configuration of the power supply apparatus 300 as shown in FIG. 3.

Referring to FIG. 5, the power supply apparatus 300 includes a DC power output unit 310, a power and data supply unit 320, an antenna 330, an RF communication unit 340, and a registration button 350.

The DC power output unit 310 supplies driving power required for each element of the power supply apparatus 300.

The DC power output unit 310 may include a converter corresponding thereto according to input power from outside.

For example, when the DC power output unit 310 is connected to a wall power, the DC power output unit 310 receives commercial AC power from outside, and may include an AC-DC converter for converting the received commercial AC power into DC power required for each element.

Alternatively, when the DC power output unit 310 is connected to a DC power source such as a battery, the DC power output unit 310 may be configured as a DC-DC converter for converting DC power supplied from the DC power supply source to DC power required for each element.

The power and data supply unit 320 supplies power to a plurality of electronic price indicators 400 connected to a power supply line.

At this point, the power and data supply unit 320 supplies a power supply voltage including data to be transmitted to the plurality of electronic price indicators 400 connected to the power supply line to the electronic price indicator 400.

The power supply voltage is modulated by the modulation method of the NFC communication and is transmitted to the electronic price indicator 400.

For this, the power and data supply unit 320 includes a plurality of regulators, and accordingly switches the power according to the data to be transmitted, thereby transmitting the data.

This will be described in more detail below.

The antenna 330 communicates with the server 100 and receives data transmitted from the server 100. The antenna 330 is preferably a 2.4 GHz band antenna.

The antenna 330 receives data transmitted from the server 100, more specifically, identification information of a specific electronic price indicator 400, and product related information or management signals to be applied to the specific electronic price indicator 400.

The RF communication unit 340 confirms the data received through the antenna 330 and outputs a control signal to the power and data supply unit 320 based on the checked data, and thus the power supply signal modulated by the confirmed data is supplied to the electronic price indicator 400.

For this, the RF communication unit 340 includes a first control port P1 and a second control port P2, and the first control port P1 and the second control port P2 are connected to the power and data supply unit 320.

Moreover, the RF communication unit 340 outputs control signals to the first control port P1 and the second control port P2 according to the received data.

At this point, the control signals transmitted to the first control port P1 and the second control port P2 may vary according to a modulation method.

Control signals supplied to the first control port P1 and the second control port P2 according to the modulation method will be described in more detail below.

The registration button 350 is a button for entering the registration mode of the newly installed electronic price indicator 400 when a new electronic price indicator 400 connected to the power supply apparatus 300 is installed.

The registration button 350 receives a registration signal according to an external operation and transmits the received registration signal to the RF communication unit 340.

When the registration signal is transmitted from the registration button 350, the RF communication unit 340 enters a registration mode and performs an operation for registering the new electronic price indicator 400 accordingly.

At this point, the RF communication unit 340 stores its own identification information, and transmits data corresponding to the own identification information to the newly installed electronic price indicator 400 through the power and data supply unit 320.

Then, the RF communication unit 340 receives identification information of the newly installed electronic price indicator 400 and stores the identification information of the RF communication unit 340 itself and the identification information of the newly installed electronic price indicator 400.

Further, the RF communication unit 340 transmits its own identification information and the identification information of the newly installed electronic price indicator 400 to the server 100.

Accordingly, the server 100 stores the identification information of the newly installed electronic price indicator 400 and the identification information of the RF communication unit 340 installed in the power supply apparatus 300 connected to the electronic price indicator 400, and stores information on displayed products of the newly installed electronic price indicator 400 by matching the stored identification information.

Here, the identification information of the RF communication unit 340 and the identification information of the newly installed electronic price indicator 400 are transmitted to the server 100 through the power supply apparatus 300, but the present invention is not limited thereto, and it is merely an embodiment thereof.

That is, the manager may obtain the identification information of the newly installed electronic price indicator 400 using a management terminal (for example, an NFC reader or a barcode reader), and transmit the obtained identification information to the server 100 together with the identification information of the RF communication unit 340.

Hereinafter, the configuration of the power and data supply unit 320 and an operation thereof will be described in more detail.

Figure 6:
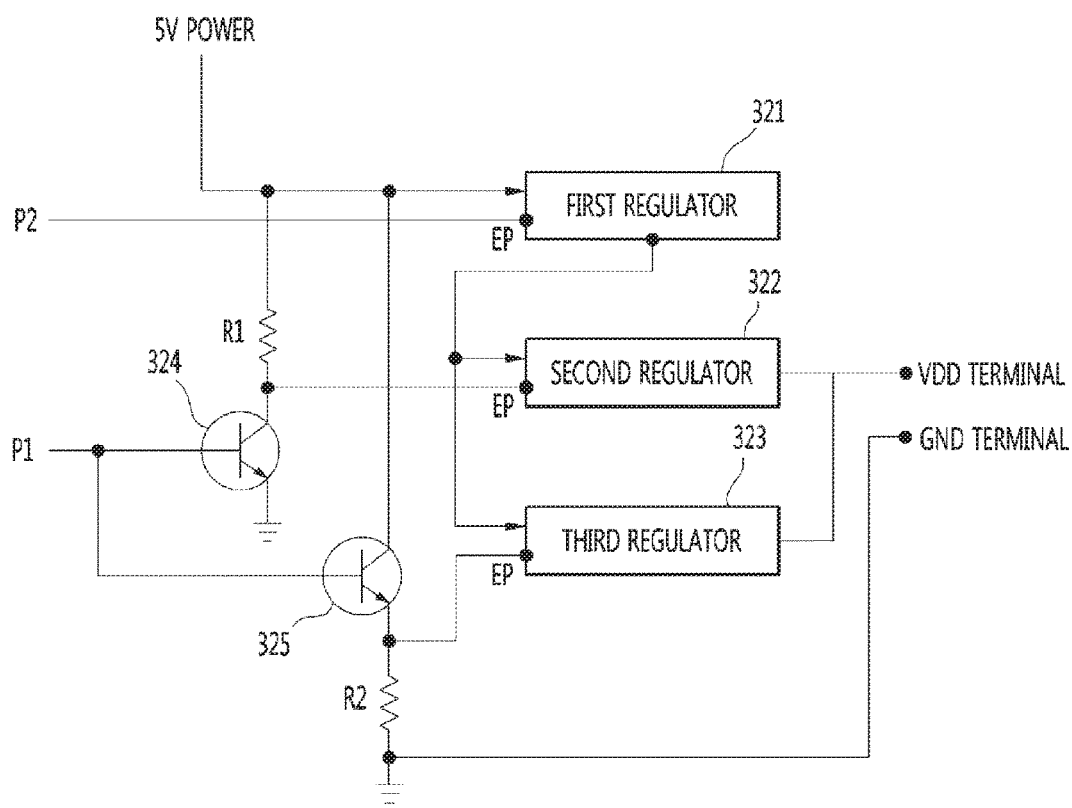
FIG. 6 is a circuit diagram illustrating a detailed configuration of a power and data supply unit 320 as shown in FIG. 5.

FIG. 6 is a circuit diagram illustrating a detailed configuration of the power and data supply unit 320 as shown in FIG. 5.

Referring to FIG. 6, the power and data supply unit 320 includes a first regulator 321, a second regulator 322, a third regulator 323, a first switching device 324 and a second switching device 325.

The first regulator 321 is connected to a power supply voltage (5V DC) and switches the connected power supply voltage to supply the switched voltage to the second regulator 322 and the third regulator 323.

An input terminal of the first regulator 321 is connected to the power supply voltage and an output terminal of the first regulator 321 is connected to the second regulator 322 and the third regulator 323.

Further, the first regulator 321 includes a first pin (EP: Enable Pin) for receiving a control signal for activation of operation, and the pin is connected to a second control port of the RF communication unit 340.

The first regulator 321 selectively performs a switching operation according to a control signal input through the first pin, and transmits a first output voltage to the second regulator 322 and the third regulator 323 connected to the output terminal.

At this point, the first regulator 321 may be a 5V regulator, so that the first output voltage may be 5V.

The second regulator 322 has an input terminal connected to the output terminal of the first regulator 321 and an output terminal connected to the first power supply line.

The second regulator 322 includes a second pin (EP: Enable Pin) for activating the operation, and is activated according to a signal input through the second pin to output a second output voltage.

Here, the operation of the second regulator 322 is determined by the signal input through the second pin and the first output voltage output through the first regulator 321.

That is, the second output voltage of the second regulator 322 is output only when an activation signal is inputted through the second pin and the first output voltage is inputted according to the switching operation of the first regulator 321.

In other words, under the conditions in which the activation signal is received through the second pin and the first output voltage is output through the first regulator 321, the second regulator 322 operates to output the second output voltage.

The second pin of the second regulator 322 is connected to a collector C of the first switching device.

The second regulator 322 is activated by using a power supply voltage selectively input according to a turn-on or a turn-off operation of the first switching device as a control signal.

The second regulator 322 may be a 3V regulator, so that the second output voltage may be 3V.

The third regulator 323 has an input terminal connected to the output terminal of the first regulator 321 and an output terminal connected to the first power supply line.

The third regulator 323 includes a third pin (EP: Enable Pin) for activating the operation, and is activated according to a signal input through the third pin to output a third output voltage.

Here, the operation of the third regulator 323 is determined by the signal input through the third pin and the first output voltage output through the first regulator 321.

That is, the third output voltage of the third regulator 323 is output only when an activation signal is inputted through the third pin and the first output voltage is inputted according to the switching operation of the first regulator 321.

In other words, under the conditions in which the activation signal is received through the third pin and the first output voltage is output through the first regulator 321, the third regulator 323 operates to output the third output voltage.

The third pin of the third regulator 323 is connected to an emitter E of the second switching device.

The third regulator 323 is activated by using a power supply voltage selectively input according to a turn-on or a turn-off operation of the second switching device as a control signal.

The third regulator 2 may be a 5V regulator, so that the third output voltage may be 5V.

In a first embodiment of the present disclosure, "0" and "1" of the received data are divided to generate a modulated power supply signal based on the difference between the second output voltage of the second regulator 322 and the third output voltage of the third regulator 323, and then the power supply signal is transmitted to the electronic price indicator 400 through the first power supply line.

In addition, in a second embodiment of the present disclosure, the first switching device 324 and the second regulator 322 may be omitted. In other words, in the second embodiment, "0" and "1" of the data are not distinguished from each other based on the difference of two different voltages, but "0" and "1" are distinguished from each other through duty adjustment of one voltage. Accordingly, the second regulator 322 and the first switching device 324 connected to the second regulator 322 may be omitted.

Accordingly, in the second embodiment of the present disclosure, only the third regulator 323 and the second switching device 325 are required, so that "0" and "1" of the data are distinguished based on the difference between the first section in which the third output voltage is output through the third regulator 323 and the second section in which the third output voltage is not output.

The first switching device 324 has a base B connected to the first control port P1 of the RF communication unit 340, the collector C is connected to the power supply voltage (5V DC) and the second pin of the second regulator 322, and the emitter E is grounded.

At this point, a first resistor R1 may be further disposed between the collector C of the first switching device 324 and the power supply voltage.

The second switching device 325 has a base B connected to the first control port P1 of the RF communication unit 340, a collector C connected to the power supply voltage, and the emitter (E) may be connected to the ground and the third pin of the third regulator 323.

At this time, a second resistor R2 may be further disposed between the emitter E of the second switching device 325 and the ground.

Figure 7:
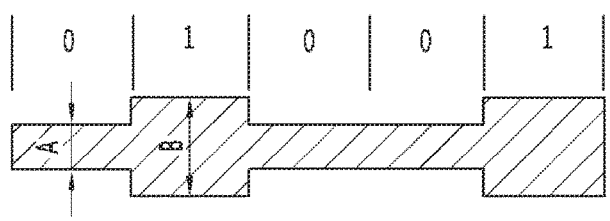
FIG. 7 illustrates a power supply signal modulated according to a first embodiment of the present disclosure.
Figures 8, 9:
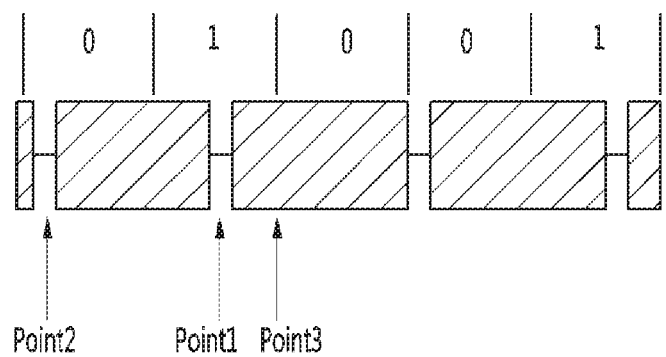
FIG. 8 illustrates a power supply signal modulated according to a second embodiment of the present disclosure.
FIG. 9 illustrates a control signal output according to an embodiment of the present disclosure.

FIG. 7 illustrates a power supply signal modulated according to a first embodiment of the present disclosure, and FIG. 8 illustrates a power supply signal modulated according to a second embodiment of the present disclosure.

Referring to FIG. 7, the modulated power supply signal includes a section having a first level A corresponding to a second output voltage of the second regulator 322 and a section having a second level B corresponding to a third output voltage of the third regulator 323.

At this point, the section having the first level A is represented by "0", and the section having the second level B is represented by "1".

Accordingly, the RF communication unit 340 outputs a control signal corresponding to the data received from the server 100 through the first control port and the second control port, and a voltage corresponding thereto is selectively output by the second regulator 322 and the third regulator 323, to distinguish "0" and "1" of the data.

FIG. 7 illustrates an NRZ-L modulation method with ASK 10% and 106 k bit/s.

Referring to FIG. 8, the modulated power supply signal is divided into a first section having a level corresponding to a third output voltage of the third regulator 323 and a second section corresponding to a zero level.

Here, the division of the data between "0" and "1" through the first section and the second section may be made as follows.

The data "1" indicates a case where a value changes in the middle of bits of the power supply signal, which is an area corresponding to the point 1.

In addition, the data "0" indicates a case where previous data is maintained as it is when the previous data is "1", which is an area corresponding to the point 3.

Further, the data "0" indicates a case where the previous data is zero or where at the start of a frame (SOF), the value is changed at the beginning of the data, which is an area corresponding to the point 2.

FIG. 8 illustrates a Modified Miller modulation method with ASK 100% and 106 k bits.

FIG. 9 illustrates a control signal output according to an embodiment of the present disclosure.

Referring to FIG. 9, Type 1 refers to a modulation method as shown in FIG. 7, and Type 2 refers to a modulation method as shown in FIG. 8.

First, the Type 1 as shown in FIG. 9 will be described.

In the case of Type 1, a signal for data selection (0 or 1) is transmitted to control port 1 (P1), and a signal for power switching is transmitted to control port 2 (P2).

Here, the case where the data "0" is expressed by 3V and the data "1" is expressed by 5V will be described.

The RF communication unit 340 outputs a low signal to the first control port P1 when the input data is "0" and a high signal to the first control port P1 when the input data is "1".

Moreover, when a high signal is output to the first control port P1, the first switching device 324 and the second switching device 325 perform a turn-on operation in response to the high signal input to the base.

As a result, no signal is supplied to the second pin of the second regulator 322, and a signal is supplied only to the third pin of the third regulator 323.

Moreover, in the Type 1, the RF communication unit 340 outputs only a high signal to the control port 2 (P2), thereby switching the first regulator 321 according to a preset frequency.

The preset frequency is preferably 13.56 MHz.

Therefore, the third regulator 323 is activated by a signal input through the third pin. At this point, the first output voltage is being output according to the switching operation of the first regulator 321, and the third regulator 323 receives the first output voltage and outputs a third output voltage based on the received first output voltage.

Accordingly, only the third regulator 323 operates in a state where a high signal is output to the first control port P1, thereby outputting a power supply signal of 5V.

Moreover, when a low signal is output to the first control port P1, the first switching device 324 and the second switching device 325 perform a turn-off operation according to the low signal input to the base.

As a result, a signal is supplied to the second pin of the second regulator 322, and no signal is supplied to the third pin of the third regulator 323.

Moreover, in the Type 1, the RF communication unit 340 outputs only a high signal to the control port 2 (P2), thereby switching the first regulator 321 according to a preset frequency.

The preset frequency is preferably 13.56 MHz.

Therefore, the second regulator 322 is activated by a signal input through the second pin. At this point, the first output voltage is being output according to the switching operation of the first regulator 321, and the second regulator 322 receives the first output voltage and outputs a second output voltage based on the received first output voltage.

Accordingly, only the second regulator 322 operates in a state where a low signal is output to the first control port P1, thereby outputting a power supply signal of 3V.

Then, describing Type 2, in the case of Type 2, the second regulator 322 and the first switching device 324 can be omitted. However, to support both Type 1 and Type 2 in one device, in the Type 2, the second regulator 322 and the first switching device 324 are configured.

In the case of Type 2, only a high signal is output to the control port 1 (P1) and a signal for data selection (0 or 1) is output to the control port 2 (P2).

Here, data "0" and "1" are determined according to the state of a section in which 5 V is output and the state of a section in which the output is not performed.

The RF communication unit 340 always outputs a high signal to the first control port P1 regardless of whether the input data is "0" or "1".

Moreover, when a high signal is output to the first control port P1, the first switching device 324 and the second switching device 325 perform a turn-on operation in response to the high signal input to the base.

As a result, no signal is supplied to the second pin of the second regulator 322, and a signal is supplied only to the third pin of the third regulator 323.

Therefore, in the Type 2, only the third regulator 323 operates.

Moreover, in the Type 2, the RF communication unit 340 outputs a high signal or a low signal for data selection to the control port 2 (P2).

When the high signal is output, the first regulator 321 performs a switching operation according to a preset frequency, and stops when a low signal is output.

The preset frequency is preferably 13.56 MHz.

Therefore, the third regulator 323 is activated by a signal input through the third pin. At this point, when the first output voltage is supplied by the first regulator 321 as a high signal is outputted to the first regulator 321, the third output voltage is outputted according to the supplied first output voltage.

The operation of the first regulator 321 is stopped when a low signal is outputted to the first regulator 321. Accordingly, the operation of the third regulator 323 is also stopped so as not to output the third output voltage.

As described in FIG. 8, the RF communication unit 340 outputs control signals to the control port 1 and the control port 2 according to the input data, and the power supply signal modulated by the control signal is output through the power and data supply unit 320.

According to the embodiment, a RF communication module to be provided in an electronic price indicator and a peripheral circuit connected thereto may be removed, thereby reducing unit cost of a product. That is, conventionally, if ten electronic price indicators and a power supply apparatus are connected, ten communication modules are required. However, according to the embodiment, since only one communication module is required, price competitiveness may be ensured accordingly.

In addition, according to the embodiment, since a block for ensuring communication performance inside the electronic price indicator is simplified, the degree of freedom of design may be increased.

Further, according to the embodiment, interference due to RF communication occurring between a plurality of electronic price indicators installed in the same shelf may be eliminated, thereby improving communication reliability.

In addition, according to the embodiment, an existing NFC communication protocol may be used as it is when data is transmitted through a power supply line, thereby having an advantage of simplifying a network structure and not requiring to develop a separate communication protocol.

FIG. 10 is a flowchart for describing a step-by-step method of registering the electronic price indicator 400 according to an embodiment of the present disclosure.

Referring to FIG. 10, a new electronic price indicator 400 is installed on a shelf in step S101.

As the new electronic price indicator 400 is installed, a registration button provided in the power supply apparatus 300 is input in step S102.

As the registration button is input, the power supply apparatus 300 switches to the registration mode in step S103, and transmits previously stored identification information to the electronic price indicator 400 in step S104.

At this point, the power supply apparatus 300 transmits a power supply signal modulated according to the identification information to the power supply line supplying driving power to the electronic price indicator 400.

Here, the identification information may be a specific ID or a MAC address of the RF communication unit included in the power supply apparatus 300.

The electronic price indicator 400 operates based on a power supply signal transmitted from the power supply apparatus 300 and receives the identification information of the power supply apparatus 300 from the power supply signal accordingly in step S105.

Then, the electronic price indicator 400 stores the received identification information of the power supply apparatus 300 in step S106.

Meanwhile, the power supply apparatus 300 transmits the identification information of the newly registered electronic price indicator 400 and its own identification information to the server 100 in step S107.

The server 100 receives the identification information of the power supply apparatus 300 and the identification information of the electronic price indicator 400 in step S108, and stores the received identification information by matching with displayed product information of the electronic price indicator 400 in step S109.

FIG. 11 is a flowchart for describing a step-by-step method of transmitting data to the electronic price indicator 400 according to an embodiment of the present disclosure.

Referring to FIG. 11, the server 100 first determines whether a change in the product information displayed on the specific electronic price indicator 400 has occurred in step S201.

As a result of the determination in step S201, when the change of the product information occurs, the server 100 checks the electronic price indicator 400 with the product information changed and the power supply apparatus 300 connected to the electronic price indicator 400 in step S202.

Then, the server 100 transmits the data corresponding to the changed product information to the confirmed power supply apparatus 300 in step S203.

At this point, the transmitted data may include product information and management signals to be reflected in the electronic price indicator 400, and identification information corresponding to the electronic price indicator 400.

The power supply apparatus 300 receives the data transmitted from the server 100 in step S204, and analyzes the received data and checks the product information according to the analyzed data and the electronic price indicator 400 on which the product information is to be reflected in step S205.

Then, the power supply apparatus 300 supplies driving power to the identified electronic price indicator 400.

Here, the power supply apparatus 300 generates a control signal for modulating the power supply based on the data corresponding to the product information in step S206.

The power supply signal modulated based on the data according to the generated control signal is supplied from the power supply apparatus 300 to the electronic price indicator 400 in step S207.

Then, the electronic price indicator 400 operates by using the power supply signal supplied from the power supply apparatus 300 as the driving power. The electronic price indicator 400 confirms the product information to be reflected according to the modulation state of the power supply signal and displays the confirmed product information in steps S208 and S209.

Meanwhile, the electronic price indicator 400 as described above wakes up only when necessary, and performs data reception and data display functions reflecting the received data.

Accordingly, the electronic price indicator 400 receives the modulated power supply signal only in the presence of data to be transmitted to itself, thereby waking up by the received power supply signal, and reflects the data corresponding to the power supply signal on the display unit.

According to the embodiment, a RF communication module to be provided in an electronic price indicator and a peripheral circuit connected thereto may be removed, thereby reducing unit cost of a product. That is, conventionally, if ten electronic price indicators and a power supply apparatus are connected, ten communication modules are required. However, according to the embodiment, since only one communication module is required, price competitiveness may be ensured accordingly.

In addition, according to the embodiment, since a block for ensuring communication performance inside the electronic price indicator is simplified, the degree of freedom of design may be increased.

Further, according to the embodiment, interference due to RF communication occurring between a plurality of electronic price indicators installed in the same shelf may be eliminated, thereby improving communication reliability.

In addition, according to the embodiment, an existing NFC communication protocol may be used as it is when data is transmitted through a power supply line, thereby having an advantage of simplifying a network structure and not requiring to develop a separate communication protocol.

Further, although exemplary embodiments of the present disclosure have been illustrated and described above, the present disclosure is not limited to particular embodiments described above. One of ordinary skill in the art to which the present disclosure pertains should be able to modify and embody the present disclosure in various ways without departing from the gist of the present disclosure defined in the claims below, and the modified embodiments should not be understood as being separate from the technical spirit or prospect of the present disclosure.

The invention claimed is:

1. A power supply apparatus, comprising:
a power supply unit connected to a plurality of electronic price indicators that supplies driving power to the electronic price indicators;
an antenna that receives data transmitted from a server; and
a communication unit that confirms a first electronic price indicator to which data received via the antenna is applied among the electronic price indicators when the data is received and outputs a control signal to the power supply unit based on the received data, such that a power supply signal modulated according to the received data is supplied to the first electronic price indicator;
wherein the modulated power supply signal is distinguished between first data and second data by at least two voltage differences, and is classified by the first data and the second data; and
wherein the power supply unit includes:
a first regulator connected to a power supply voltage and that generates an output voltage according to a first control signal output through the communication unit,
a second regulator driven by an output voltage generated through the first regulator and that generates a first level voltage according to a second control signal output through the communication unit, and
a first switching device having an emitter connected to the second regulator, a base connected to the communication unit, and a collector connected to the power supply voltage.

2. The power supply apparatus of claim 1, wherein the power supply unit is connected to the electronic price indicators through a first power supply line that supplies the power supply signal and a second power supply line for grounding, and transmits the power supply signal modulated by the data through the first power supply line to the first electronic price indicator.

3. The power supply apparatus of claim 1, wherein the power supply unit further includes:
a third regulator driven by an output voltage generated through the first regulator and that generates a second level voltage according to a second control signal output through the communication unit, and
a second switching device having a collector connected to the third regulator and the power supply voltage, a base connected to the communication unit, and an emitter grounded.

4. The power supply apparatus of claim 3, wherein the modulated power supply signal comprises a first section in which the first level voltage is input and a second section in which a second level voltage different from the first level voltage is input.

5. The power supply apparatus of claim 4, wherein:
the communication unit outputs a first control signal of a high level and a second control signal of a high level or a low level according to the received data;
when the second control signal has a high level, the third regulator operates; and
when the second control signal has a low level, the second regulator operates.

6. The power supply apparatus of claim 1, wherein the modulated power supply signal comprises a first section in which the first level voltage is input and a second section in which no voltage is input.

7. The power supply apparatus of claim 6, wherein:
the communication unit outputs a second control signal of a high level and a first control signal of a high level or a low level according to the received data;
and
the second regulator operates when the first control signal of the high level is outputted to output the first level voltage.

8. The power supply apparatus of claim 1, further comprising a registration button for registering an unregistered second electronic price indicator,
wherein the communication unit supplies a power supply signal modulated by its own identification information to the second electronic price indicator as the registration button is input.

9. The power supply apparatus of claim 1, wherein the power supply signal is modulated by a near field communication (NFC) communication protocol.

10. The power supply apparatus of claim 1, wherein the power supply signal is modulated by a NRZ-L method or a Modified Miller method of a near field communication (NFC) communication protocol.

11. An electronic price indicating system, comprising:
electronic price indicators for displaying product information; and
a power supply apparatus connected to the electronic price indicators to supply a driving signal that is driving power of the electronic price indicators;
wherein the power supply apparatus comprises:
a power supply unit connected to the electronic price indicators that supplies the driving power to the electronic price indicators;
an antenna that receives data transmitted from a server; and
a communication unit that confirms a first electronic price indicator among the electronic price indicators to which data received via the antenna is applied when the data is received and that outputs a control signal to the power supply unit based on the received data, such that a power supply signal modulated according to the received data is supplied to the first electronic price indicator;
wherein the modulated power supply signal representing first data and the modulated power supply signal representing second data are distinguished by at least two voltage differences, wherein each of the electronic price indicators comprises:

a smoothing unit including a power port connected to the power supply apparatus and that receives a power supply signal supplied from the power supply apparatus;

a power supply signal analyzing unit driven by the power supply signal received through the smoothing unit and that analyzes the power supply signal to confirm the product information; and a display unit for displaying the product information confirmed through the power supply signal analyzing unit;

wherein the power supply signal is modulated based on data corresponding to the product information, wherein each of the electronic price indicators does not include a communication module for communication with a server and receives the power supply signal including the product information, wherein the power supply unit includes:

a first regulator connected to a power supply voltage and that generates an output voltage according to a first control signal output through the communication unit;

a second regulator driven by an output voltage generated through the first regulator and that generates a first level voltage according to a second control signal output through the communication unit; and a first switching device having an emitter connected to the second regulator, a base connected to the communication unit, and a collector connected to the power supply voltage.

12. The electronic price indicating system of claim 11, wherein the power supply unit further includes:

a third regulator driven by an output voltage generated through the first regulator and that generates a second level voltage according to a second control signal output through the communication unit; and a second switching device having a collector connected to the third regulator and the power supply voltage, a base connected to the communication unit, and an emitter grounded;

wherein:

the modulated power supply signal includes a first section in which the first level voltage is input and a second section in which the second level voltage different from the first level is input; and the power supply analyzing unit recognizes the first section and the second section as the first data and the second data, respectively.

13. The electronic price indicating system of claim 11, wherein:

the modulated power supply signal includes a first section in which the first level voltage is input and a second section in which no voltage is input; and the power supply analyzing unit recognizes the first data and the second data based on a change point of the first section and the second section and a previous data value, respectively.

14. The electronic price indicating system of claim 11, wherein:

the power supply signal is modulated by a near field communication (NFC) communication protocol; and the power supply signal analyzing unit demodulates the power supply signal modulated by the NFC communication protocol.

* * * * *